(No Model)

H. LINDESTRÖM & A. JERNBERG.
CUTTING APPARATUS.

No. 404,548. Patented June 4, 1889.

Witnesses
E. B. Ellias
Louis M. F. Whitehead

Inventors
Hjalmar Lindeström and
August Jernberg
Dayton Poole & Brown
Attorneys

UNITED STATES PATENT OFFICE.

HJALMAR LINDESTRÖM AND AUGUST JERNBERG, OF CHICAGO, ILLINOIS.

CUTTING APPARATUS.

SPECIFICATION forming part of Letters Patent No. 404,548, dated June 4, 1889.

Application filed June 6, 1888. Serial No. 276,287. (No model.)

*To all whom it may concern:*

Be it known that we, HJALMAR LINDESTRÖM, a subject of the King of Sweden and Norway, and AUGUST JERNBERG, a citizen of the United States, both residents of the city of Chicago, in the county of Cook and State of Illinois, have invented certain new and useful Improvements in Cutting Apparatus; and we do hereby declare that the following is a full, clear, and exact description thereof, reference being had to the accompanying drawings, and to the letters of reference marked thereon, which form a part of this specification.

This invention relates to improvements in cutting apparatus for harvesters, mowers, and the like; and it consists in the novel devices and combination of devices herein shown, described, and more particularly pointed out in the appended claims.

Figure 1:
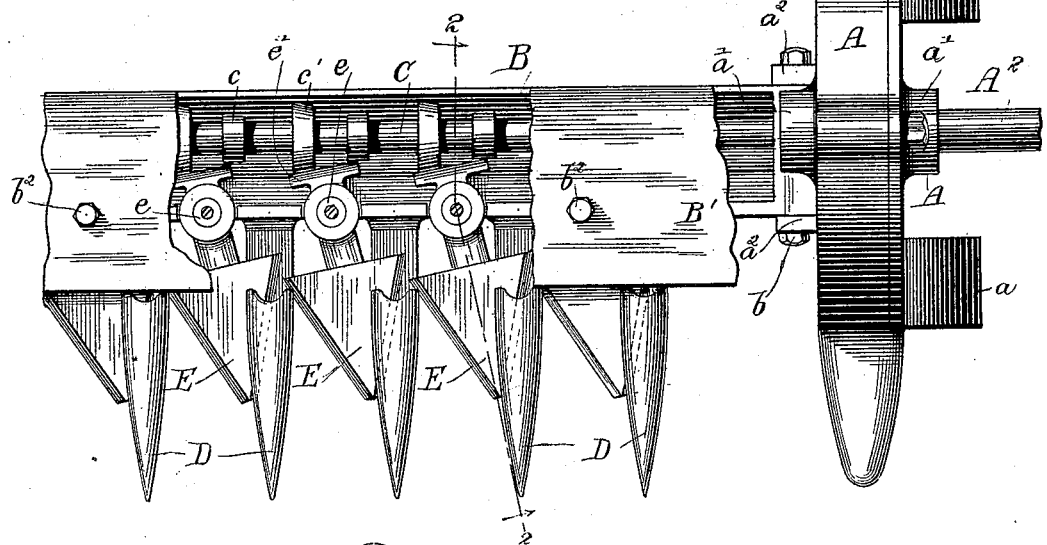
Figure 2:
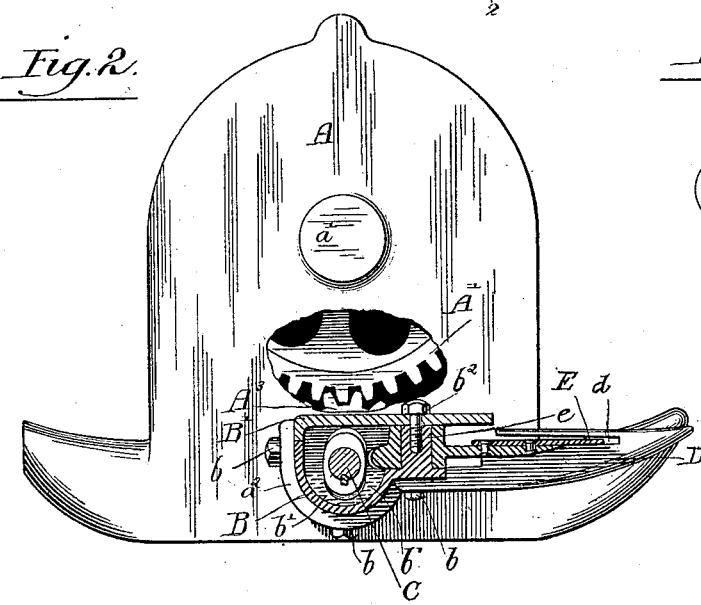
Figure 3:
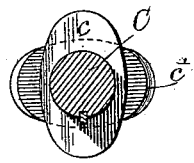

In the accompanying drawings, Figure 1 is a plan view of a portion of a harvester embodying our invention, a part of the frame thereof being broken away to more clearly illustrate the several knives and the mechanism for driving the same. Fig. 2 is a vertical sectional view taken upon line 2 2 of Fig. 1 and looking in the direction indicated by the arrows. The driving-gear housing in this view is seen in elevation, and a portion of the same is broken away to more clearly illustrate the driving mechanism. Fig. 3 is an enlarged vertical sectional view of the revolving shaft which operates the knives, showing clearly the cams mounted thereon.

In the drawings, A is a metal housing provided with the lugs $a$, whereby the cutting apparatus may be hinged, bolted, or otherwise secured to a harvester in a familiar manner. Within the said housing A is the spur gear-wheel A′, mounted upon a shaft $A^2$, the end of which shaft passes through the housing A and is revolubly secured in suitable bearings $a'$. On the side of the housing A opposite to the hinge-lugs $a$ is the segmental flange or projection $a^2$.

B is a metal frame or housing curved or U-shaped at its lower portion and adapted to rest at one end upon and within the flange $a^2$. The frame B is secured to the housing A by means of bolts $b$, which pass through suitable openings in the flange $a^2$ and are screwed into the end of said frame B.

C is a shaft mounted in suitable bearings in the ends of said frame B, which shaft extends longitudinally through said frame B and projects through one end thereof and into the housing A.

$A^3$ is a small spur gear-wheel mounted within the housing A upon the end of the shaft C, and which meshes with the gear-wheel A′. $c\ c'$ are cams mounted upon said shaft C at suitable intervals opposite the several knives or cutters.

D are finger-guards, which are bolted to a lateral extension of the frame B, and which project outwardly in a familiar manner. $d$ are the slots in said guards D for the knives E to work in.

The cutting-knives E are separately mounted over vertical trunnions or pivots $e$ upon the frame B, and are each provided with an extension or arm $e'$. These extensions $e'$ are of sufficient width to engage at all times one of the two cams $c\ c'$, located on the shaft C opposite each knife E, as clearly shown in Fig. 1. The bearing-edges of the cams $c\ c'$ are identical in shape, and said cams are located upon the shaft C at right angles to each other to alternately engage the extension or arm $e'$. In practice power is communicated to the shaft C from, and said shaft C is rotated by, the shaft $A^2$ by means of the gear-wheels A′ $A^3$. In Fig. 1 the extensions $e'$ of the several knives are each illustrated as engaging the bearing-surface of the several cams $c$, and the knives E are shown inclined or oscillated toward the driving mechanism. The continued rotation of the shaft C, however, gradually brings the operating portion of the cams $c'$ into play, and at the same time retracts or withdraws the operating-surface of the cam $c$ from engagement with said extension or arm $e'$, and thereby oscillates said knives E on their pivots in the opposite direction from that illustrated in said Fig. 1. This rotary movement of the shaft C and the alternate engagement and disengagement of the cams $c\ c'$ with the extension or arm $e'$ thus produces the desired vibrating cutting movement of the knives E.

We sometimes find it convenient to lubricate the cams $c\ c'$, and for this purpose we prefer to place the oil or other lubricant in the bottom or trough of the frame E, as shown at $b'$. To prevent the oil from being wasted and splashed outwardly, and also for the further protection of the said cams, we place a top plate or piece B' upon said frame B and securely bolt the same to the trunnions or pivots $e$ by means of the stud-bolts $b^2$, as clearly shown in Fig. 2.

What we claim as our invention, and desire to secure by Letters Patent, is—

1. In a cutting apparatus for harvesters, a revolving shaft mounted longitudinally in a suitable frame, a plurality of knives, each pivoted to said frame, and a plurality of cams, the cams for each knife being mounted in pairs on said shaft and at right angles to each other for the alternate engagement of said knife, substantially as specified.

2. In a cutting apparatus for harvesters, a revolving shaft mounted longitudinally in a suitable frame, a plurality of knives pivoted to said frame, said knives being formed with extensions $e'$, and a plurality of cams on said shaft mounted in pairs and at right angles to each other, said extensions $e'$ being of such width as to engage at all times one cam of each pair of cams, substantially as described.

3. In a cutting apparatus for harvesters, a suitable frame, a shaft mounted thereon, a plurality of knives pivoted to the frame, and a plurality of cams on said shaft for engagement with the knives, the said frame being curved at its lower portion to form a trough or receptacle for oil or other lubricant into which the cams dip as they revolve and provided with a removable top plate B', all substantially as described.

In testimony that we claim the foregoing as our invention we affix our signatures in presence of two witnesses.

HJALMAR LINDESTRÖM.
AUGUST JERNBERG.

Witnesses:
E. B. ELLIAS,
LOUIS M. F. WHITEHEAD.